(12) United States Patent
Su

(10) Patent No.: US 9,736,095 B2
(45) Date of Patent: *Aug. 15, 2017

(54) ACCESSING THIRD-PARTY COMMUNICATION SERVICE VIA A SOCIAL NETWORKING SYSTEM

(71) Applicant: Facebook, Inc., Menlo Park, CA (US)

(72) Inventor: Philip Ti-Fei Su, Kirland, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,697

(22) Filed: May 2, 2016

(65) Prior Publication Data

US 2016/0248709 A1 Aug. 25, 2016

Related U.S. Application Data

(63) Continuation of application No. 13/172,469, filed on Jun. 29, 2011, now Pat. No. 9,361,652.

(51) Int. Cl.
*G06F 15/16* (2006.01)
*H04W 4/00* (2009.01)
(Continued)

(52) U.S. Cl.
CPC .......... *H04L 51/046* (2013.01); *G06F 3/0482* (2013.01); *G06F 17/2247* (2013.01); *G06Q 50/01* (2013.01); *H04L 51/32* (2013.01); *H04L 63/0428* (2013.01); *H04L 63/08* (2013.01); *H04L 63/102* (2013.01); *H04L 65/1069* (2013.01); *H04L 65/403* (2013.01); *H04L 67/306* (2013.01); *H04M 7/006* (2013.01)

(58) Field of Classification Search
CPC ............... H04L 29/06; H04L 29/08072; H04L 29/06027; H04L 12/581; H04L 29/0809; H04L 29/06047; H04L 29/0899; G06Q 10/10; G06Q 30/02; G06Q 20/382; G06Q 20/3674; G06Q 30/06; H04W 84/12; H04W 84/18; H04W 80/04; H04W 8/26; H04W 88/06; G06F 21/10; G06F 3/0481; G06F 3/0486
USPC ........................................................ 709/204
See application file for complete search history.

(56) References Cited

U.S. PATENT DOCUMENTS

2003/0061484 A1* 3/2003 Noble ..................... H04L 9/321
713/168
2005/0137981 A1* 6/2005 Maes ................. H04L 29/12009
705/44

(Continued)

*Primary Examiner* — Mahran Abu Roumi
(74) *Attorney, Agent, or Firm* — Fenwick & West LLP

(57) ABSTRACT

A user interface in a social networking system enables users to connect to and interact with each other using a third-party communication service, such as a VoIP or video chat service. A user initiates an interaction with another user in the social networking system, which passes the users' information to the third-party communication service provider to allow it to provide the requested service. The social networking system may pass an encrypted identifier for the users so that the third-party communication service does not have access to the real identities of the social networking system's users. A user of the social networking system may use this process to video conference with users of the third-party communication service, rather than just other users of the social networking system, and vice versa.

19 Claims, 6 Drawing Sheets

(51) Int. Cl.
*G06F 21/00* (2013.01)
*H04L 12/58* (2006.01)
*G06Q 50/00* (2012.01)
*H04L 29/06* (2006.01)
*H04L 29/08* (2006.01)
*G06F 3/0482* (2013.01)
*G06F 17/22* (2006.01)
*H04M 7/00* (2006.01)

(56) References Cited

U.S. PATENT DOCUMENTS

| | | | | |
|---|---|---|---|---|
| 2008/0196098 A1* | 8/2008 | Cottrell | ............... | H04L 63/0414 |
| | | | | 726/12 |
| 2009/0158030 A1* | 6/2009 | Rasti | ............... | H04L 63/0421 |
| | | | | 713/156 |
| 2009/0305671 A1* | 12/2009 | Luft | ............... | G06Q 30/0205 |
| | | | | 455/411 |
| 2011/0085667 A1* | 4/2011 | Berrios | ............... | G06F 21/445 |
| | | | | 380/282 |
| 2011/0145150 A1* | 6/2011 | Onischuk | ............... | G06Q 30/08 |
| | | | | 705/50 |
| 2012/0311029 A1* | 12/2012 | Schuster | ............... | G06Q 10/10 |
| | | | | 709/204 |

\* cited by examiner

ACCESSING THIRD-PARTY COMMUNICATION SERVICE VIA A SOCIAL NETWORKING SYSTEM

RELATED APPLICATIONS

This application is a Continuation of U.S. patent application Ser. No. 13/172,469, filed Jun. 29, 2011, which is incorporated by reference in its entirety.

BACKGROUND

This invention relates generally to social networking and, in particular, to accessing a third-party communication service (such as VoIP or video chat) via a social networking system.

When users of a social networking system wish to use a third-party communication service, they typically access the communication service via a web browser or mobile device independently of the social networking system. For example, a third-party communication service may enable users to make free long distance phone calls via voice over IP (VoIP) technology through computers, digital telephony, and mobile devices. Users of a social networking system must create a separate account (e.g., login and password) on these third-party communication services and sometimes must download particular client software to use the third-party communication services.

An open login system of user authentication has been used by social networking systems that enables users to login into the social networking system with their login and password credentials only once via a social plug-in in a web browser. Thereafter, a user may log into a third-party system using his or her login and password credentials for the social networking system. This open login system has enabled third-party systems to use information gathered by the social networking system, such as a user's name, photo, age, and location. This information is only shared with third-party systems with the express consent of the user. Additionally, the third-party system does not receive the unique user identifier of the user logging in, but instead, they receive only the user-authorized information that has been gathered on the social networking system.

Despite the emergence of open login systems, social networking systems have not enabled users to access third-party communication systems from within the social networking systems. Specialized technology that operates on third-party communication services, such as the VoIP phone calls mentioned above, are not used via social networking systems. Additionally, administrators of social networking systems, in an effort to protect the security and privacy of their users, are hesitant to share the unique user identifiers associated with their users with third-party communication services.

SUMMARY

Embodiments of the invention provide a user interface in a social networking system that enables users to connect to and interact with each other using a third-party communication service (e.g., a video chat or other communication session) without their identities being shared with the third-party communication service. In one embodiment, a user initiates an interaction with another user from an interface of the social networking system, where the interaction is to be carried out by the third-party communication service provider. If either of the users is not already a user of the third-party communication service, the social networking system passes an encrypted identifier for those users so that the third-party communication service does not have access to the unique user identifiers of the social networking system's users. The third-party communication service may generate a "shadow identifier" for each of the users and communicate the shadow identifier back to the social networking system for associating with each user's account. Thereafter, the social networking system uses these shadow identifiers to identify the users when negotiating context on behalf of the users for any interactions using the third-party communication service. This allows the social networking system to prevent sharing of the users' identities with the third-party communication service provider while allowing the social networking system to enable its users to use the third-party communication service from within the social networking system.

In another embodiment, a user of the third-party communication service can use a user interface of the third-party communication service to initiate an interaction (e.g., a video chat or other communication session) with a user of a social networking system. In this embodiment, the third-party communication service may generate a shadow identifier for a plurality of users of the social networking system and communicate the shadow identifiers to the social networking system, which stores the shadow identifiers in connection with the users' accounts. The third-party communication service initiates an interaction with the receiving user in the social networking system by specifying that user's shadow identifier to the social networking system. In response, the social networking system provides a user interface to the user receiving this interaction to allow the requested interaction between the two users. For a video chat, for example, the social networking system may pop up a video chat window and establish a video chat session with the initiating user of the third-party communication service. This enables users of the third-party communication service to interact with users of the social networking system without the third-party communication service knowing the identity of the user who is receiving the interaction from within the social networking system.

In one embodiment, the social networking system maintains presence information for its users. The social networking system may then provide a user interface for a particular user that lists that user's connections in the social networking system, and this listing may be based on the presence information for those connections (e.g., showing only available connections). In embodiments where the initiating user is using an interface of the third-party communication service, the third-party communication service may obtain the presence information for that user's connections in the social networking system, e.g., by using APIs provides by the social networking system and referencing the user by his or her shadow identifier. In this way, users can initiate interactions using an interface that shows social and presence information, regardless of whether they are accessing the services from the social networking system or the third-party communication service, while preventing sharing of user identities with the third-party communication service.

Figure 1:
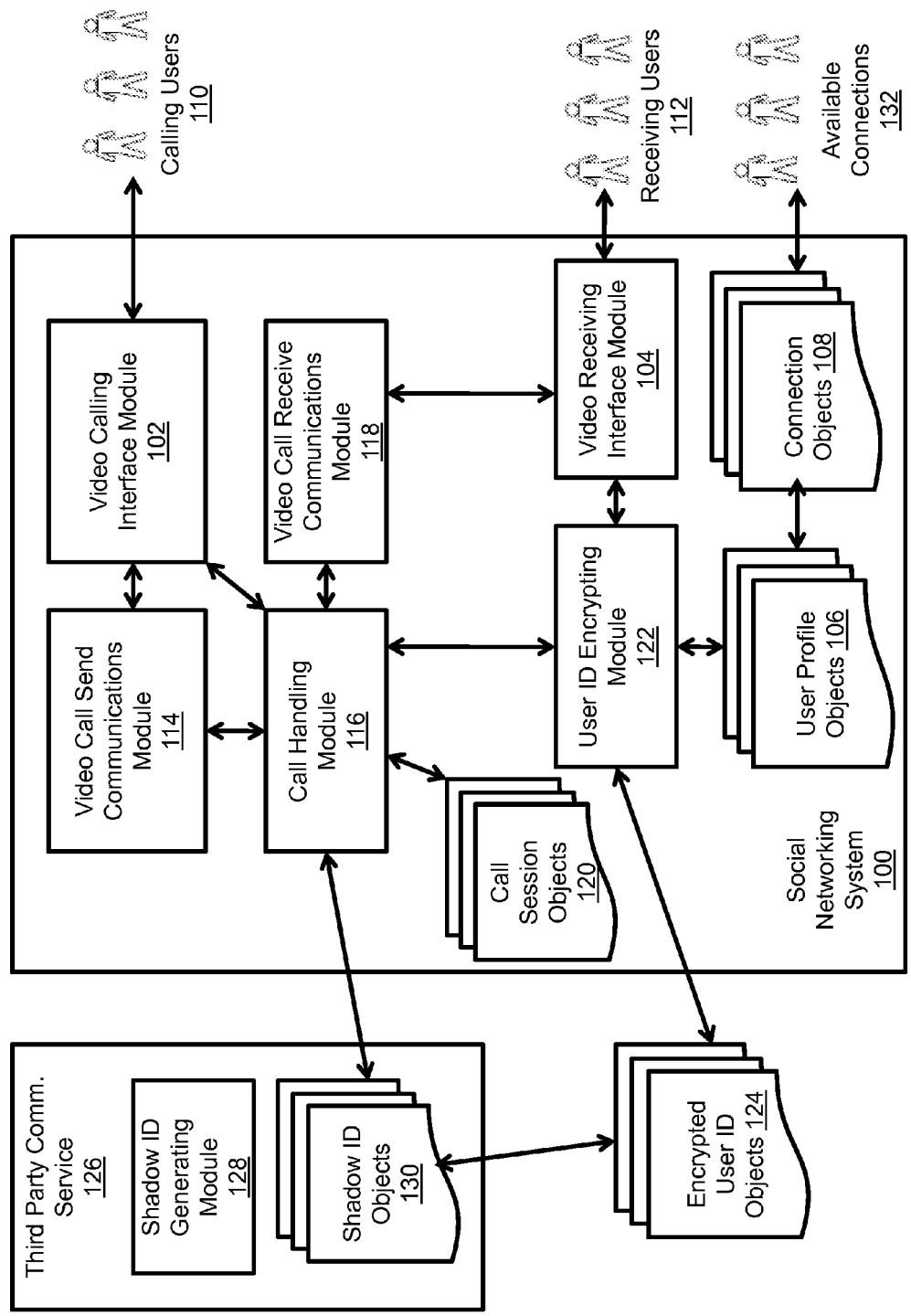
FIG. 1 is a high-level block diagram illustrating a process of accessing a third-party communication service via a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of a social networking system can provide information describing themselves, and the information is stored by the social networking system as user profile information. For example, a user can provide age, gender, geographical location, education history, employment history and the like. The information provided by users may be used by the social networking system to direct information to the user. For example, the social networking system may recommend social groups, events, and potential friends to a user.

In addition to declarative information provided by users, social networking systems may also record users' actions on the social networking system. These actions include communications with other users, sharing photos, interactions with applications that operate on the social networking system (such as a social gaming application), responding to a poll, adding an interest, and joining an employee network, just to name a few. A social networking system may also be able to capture external website data that is accessed by its users. This external website data may include websites that are frequently visited, links that are selected, and other browsing data. Information about users, such as their interests in particular users and other objects, can be generated from these recorded actions by the social networking system using appropriate models.

Because of the vast amount of information that can be captured, analyzed, and inferred about users of a social networking system, administrators of the social networking system are highly protective of the identities of their users. The privacy of user profile information and security of the gathered information about users is highly guarded and valued by administrators of a social networking system because this information enables highly targeted advertising based on the interests recorded, analyzed, and inferred based on user profile information. Though partnerships with third-party communication services may be lucrative and beneficial to users of both the social networking system and third-party communication services, the identities of the users of the social networking system must be protected to maintain the value of the information gathered about these users.

Integrating a third-party communication service into a social networking system benefits both groups of users. For example, a third-party communication service, such as a video chat service provider, can be integrated into the social networking experience, taking advantage social actions such as displaying news stories to a user that indicate the availability of connections for phone calls via the user's computer or mobile device. Some connections may be prioritized in the news feed based on the user's affinity for those connections. In this way, users of the social networking system receive a more personalized experience by showing the presence information of other users that are available to take a phone call via a VoIP telephony service provider, a third-party communication service, from within the social networking system.

To integrate the third-party communication service while addressing the privacy and data security concerns of administrators, a social networking system may encrypt the user identifiers associated with users of the social networking system and pass these encrypted user identifiers to the third-party communication service to generate shadow identifiers. These shadow identifiers can be associated with the user profiles of users on the social networking system such that they can be identified by the third-party communication service. This enables users of the social networking system to use the third-party communication service without creating a separate account on the third-party communication service. The third-party communication service utilizes the shadow identifiers that it dynamically generates from the received encrypted user identifiers from the social networking system on a rolling basis as users of the social networking system take advantage of the service from within the social networking experience. In this way, the social networking system and the third-party communication service may utilize the shadow identifiers to identify and connect users from within the social networking system via a client device, such as a web browser or mobile application, without divulging the identities of the users of the social networking system to the third-party communication service.

FIG. 1 is a diagram of a process of accessing a third-party communication service via a social networking system, in accordance with an embodiment of the invention. The social networking system 100 engages calling users 110, receiving users 112, and available connections 132 with an integrated third-party communication service. In this example embodiment, the third-party communication service enables users to make video conferencing calls from their computers and mobile devices. The third-party communication service employs its own technology to establish the video conference call, receive audio/video content, compress the data for transmission, and maintain the connection. Other embodiments may include other communications technology, such as VoIP telephony, instant messaging, email communications, SMS, and collaborative data sharing such as video sharing, online music websites, and file sharing. All users of the social networking system 100 may be calling users 110, receiving users 112, and available connections 132. Additionally, users of the third-party communication service may also be calling users, receiving users, and available connections, enabling those users to make call to and receive calls from users of the social networking system through the use of encrypted user identifiers and shadow identifiers. The different types of users are delineated to illustrate the examples described below.

The social networking system 100 stores various objects comprising information related to users, connections between users, or other entities represented in the social networking system 100. These objects include user profile objects 106 that store information describing the users of the social networking system 100, connection objects 108 that describe connections of the users of the social networking system 100, encrypted user ID objects 124 that are created by a user ID encrypting module 122 to mask the identities of users of the social networking system 100 to third-party communication services, and call session objects 120 that include information about calls made and received by users of the social networking system 100. The encrypted user ID objects 124 are passed from the social networking system 100 to a third-party communication service 126. Using the encrypted user ID objects 124, the third-party communication service 126 utilizes a shadow identifier generating module 128 to create shadow identifier objects 130 for use by the third-party communication service 126 and the social networking system 100 to identify users of a social networking system 100. The third-party communication service 126 passes the generated shadow identifier objects 130 back to the social networking system 100 so that the shadow identifier objects 130 may be utilized to refer to the users of the social networking system 100 without revealing private and guarded information about their identities, including full name, email address, and date of birth. In another embodiment, the encrypted user ID objects 124 may be utilized by the third-party communication service 126 as shadow identifier objects 130 to refer to the users of the social networking system.

Users of the social networking system 100 may initiate a call as a calling user 110 through a video calling interface module 102. The initiated call is handled by a call handling module 116, which utilizes a video call send communications module 114 and video call receive communications module 118 to establish the video conference call through the third-party communication service. Receiving users 112 then receive an indication through a video receiving interface module 104 that a call is being received. If the call is accepted by the receiving users 112, the call is established through the third-party communication service via the video call send communications module 114 and video call receive communications module 118 between the calling users 110 and receiving users 112.

A video calling interface module 102 provides an interface through which calling users 110 may select other users to communicate with through the third-party communication service. Alternatively, the video calling interface module 102 may be referred to as a communications interface, in other embodiments. The video calling interface module 102 includes selectable avatars associated with available connections 132 on the social networking system 100 that are available to receive a call. A calling user 110 may select one or more available connections 132 to initiate a video conferencing call through the video calling interface module 102. In one embodiment, the video calling interface module 102 also uses the information about users of the social networking system 100 as provided in their respective user profile objects 106 to prioritize available connections 132 displayed to the calling user 110.

The video calling interface module 102 receives the selected available connections 132 and provides an indication to the calling user 110 for display that the call request is being processed. If the call is accepted by the receiving users 112, then the video calling interface module 102 receives audiovisual content through the device that is displaying the video calling interface, such as a computer operating a web browser or a mobile device running an application connected to the social networking system. In one embodiment, the video calling interface module 102 integrates technology created by a third-party communication service to receive, compress, and transmit audiovisual content into the interface used by calling users 110. In another embodiment, the technology is embedded into the interface using iFrames, HTML, XML, and/or a proprietary markup language created by administrators of the social networking system.

Like the video calling interface module 102, the video receiving interface module 104 uses technology created by the third-party communication service. Alternatively, the video receiving interface module 104 may be referred to as a receiver interface. When a call is initiated by a calling user 110, the video receiving interface module 104 displays an indication to the receiving user 112 that a call request is being sent by the calling user 110. If the call is accepted, the video conferencing call is established between the calling user 110 and the receiving user 112 and audiovisual content, including streaming video content, is sent to and received from the receiving user 112. In one embodiment, the video receiving interface module 104 integrates the technology to receive, compress, and transmit audiovisual content into the interface used by receiving users 112. In another embodiment, the technology is embedded into the interface using iFrames, HTML, XML, and/or a proprietary markup language created by administrators of the social networking system.

User profile objects 106 are associated with users on the social networking system 100. The user profile objects 106 include declared profile information and analyzed information gathered by the social networking system 100 as recorded through interactions on the social networking system 100 and external websites. In addition, user profile objects 106 are uniquely identified by a user identifier. Every user on the social networking system 100 is associated with a unique user identifier. These user identifiers are first encrypted by the user ID encrypting module 122 when a calling user 110 initiates a call with a receiving user 112 on the social networking system 100 for the first time, in one embodiment. In an alternative embodiment, user identifiers may be encrypted by the user ID encrypting module 122 in a batch process. The third-party communication service 126 receives encrypted user ID objects 124 for the calling user 110 and the receiving user 112 in order to generate shadow identifier objects 130 using a shadow identifier generating module 128, in one embodiment. The third-party communication service 126 then sends the generated shadow identifier objects 130 to the social networking system 100. The shadow identifier objects 130 are then associated with either the calling user 110 or the receiving user 112. The shadow identifier objects 130 and the encrypted user ID objects 124 are permanently associated with the user profile objects 106 associated with the calling user 110 and receiving user 112, in one embodiment. In another embodiment, encrypted user ID objects 124 may be used as shadow identifier objects 130 to reference the associated user profile objects 106 for the calling user 110 and receiving user 112.

Connection objects 108 represent users that are connected to calling users 110. Connections may include direct connections (e.g., "friends") as well as indirect connections (e.g., "friends of friends," or users in the same network, group, place, or geographic location). For example, a calling user 110 may wish to video conference with another user that went to the same college. In one embodiment, indirect connections may be available connections 132 that the calling user 110 could call via the third-party communication service. Additionally, available connections 132 may also include users of the third-party communication service that are not users of the social networking system 100. Connections, both direct and indirect, may select an option to make themselves available to calls from other users on the social networking system 100 and the third-party communication service, in one embodiment. Connections may also select specific times of the day to specify availability. By referring to these users of the third-party communication service by shadow identifiers, both the social networking system 100 and the third-party communication service may maintain presence information for those users to indicate their availability. After available connections 132 are selected by a calling user 110 and a call is initiated, they become receiving users 112, as shown in FIG. 1.

A call handling module 116 manages calls initiated by calling users 110 and generates call session objects 120 that record information about established calls, such as time, date, calling user 110, receiving user(s) 112, and the calling user 110 and receiving user(s)'s encrypted user ID objects 124 and shadow identifier objects 130, if applicable. A transaction record is stored in the call session object 120 for each of the managed calls. The call handling module 116 also coordinates messaging between the video calling interface module 102, video receiving interface module 104, video call send communications module 114, video call receive communications module 118, shadow identifier generating module 128, and the user ID encrypting module 122. For example, a call initiated by a calling user 110 using the video calling interface module 102 sends a message to the call handling module 116 that a new call is being established. A call session object 120 is generated for this new call, recording the time, date, calling user 110's associated user profile object 106, receiving user(s)'s 112 associated user profile object 106, and the generated encrypted user ID objects 124 and shadow identifier objects 130 for the calling user 110 and receiving user(s) 112. Encrypted user ID objects 124 may only be generated on the first call initiated by a calling user 110 or the first call received by a receiving user 112, in one embodiment. Thereafter, the encrypted user ID objects 124 are associated with the user profile objects 106 for calling users 110 and receiving users 112. Similarly, shadow identifier objects 130 are only generated if the calling user 110 or the receiving user 112 does not have an account on the third-party communication service, in one embodiment. In another embodiment, shadow identifier objects 130 are generated for calling users 110 and receiving users 112 during their first initiated or received call regardless of whether accounts already exist for those users on the third-party communication service.

The call handling module 116 also provides information about users of the social networking system 100 to the third-party communication service, such as profile picture, location, age, gender, and limited connection information. The call handling module 116 shares this information about users of the social networking system 100 without providing identifying information, such as the email address, mailing address, phone number, or the unique user identifier used by the social networking system 100 to identify its users. The call handling module 116 receives information about users from user profile objects 106 and then uses the user ID encrypting module 122 to generate encrypted user ID objects 124 to mask the identities of users of the social networking system 100. The call handling module 116 also coordinates the requests for a video conferencing call initiated by calling users 110 to available connections 132.

The call handling module 116 also provides presence information, or call availability, to the video calling interface module 102 to identify available connections 132 to the calling user 110 that are available for a video conferencing call. In one embodiment, connections must specifically allow calling users 110 to sense their online presence. In another embodiment, connections may specify what times and days they are available for video conferencing. In yet another embodiment, connections that are actively using the social networking system 100 are considered available connections 132. Available connections 132 may also include users of the third-party communication service that are not already users of the social networking system 100.

Receiving users 112, or available connections 132 that have been selected to receive a call from a calling user 110, receive an indication that a calling user 110 has initiated a call request. The indication may be implemented as any communication with users on the social networking system 100, including email messages, wall posts, pop-up notifications, text messages, and instant messages. Once the request to initiate the call has been accepted by the receiving user 112, the call handling module 116 instantiates a video receiving interface module 104 to establish the video conference call with the calling user 110.

System Architecture

Figure 2:
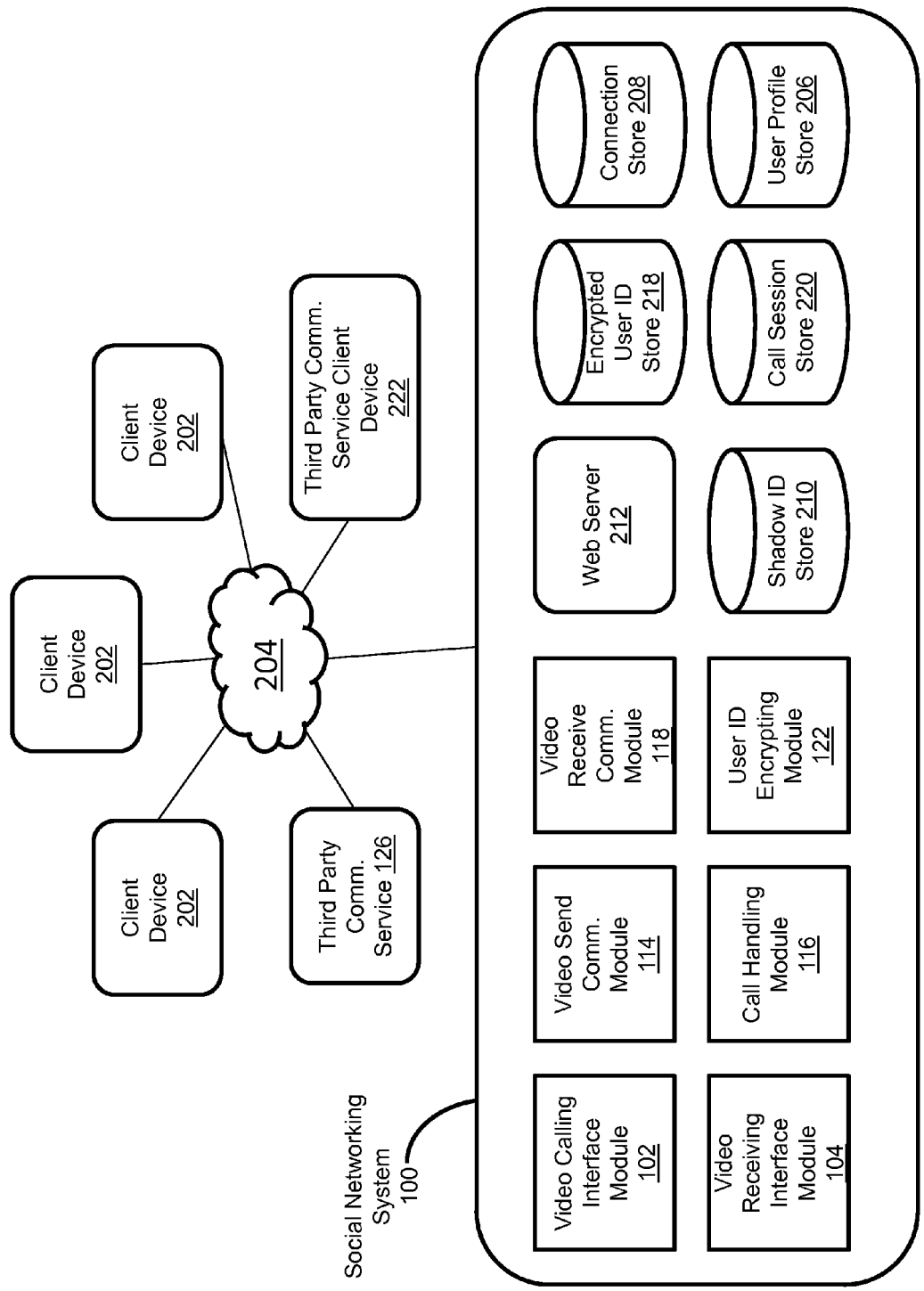
FIG. 2 is a network diagram of a system for accessing a third-party communication service, showing a block diagram of the social networking system, in accordance with an embodiment of the invention.

FIG. 2 is a high level block diagram illustrating a system environment suitable for tagging and targeting questions asked by users on a social networking system, in accordance with an embodiment of the invention. The system environment comprises one or more client devices 202, the social networking system 100, a network 204, a third-party communication service 214, and a third-party communication service client device 222. In alternative configurations, different and/or additional modules can be included in the system.

The client devices 202 comprise one or more computing devices that can receive user input and can transmit and receive data via the network 204. In one embodiment, the client device 202 is a conventional computer system executing, for example, a Microsoft Windows-compatible operating system (OS), Apple OS X, and/or a Linux distribution. In another embodiment, the client device 202 can be a device having computer functionality, such as a personal digital assistant (PDA), mobile telephone, smart-phone, etc. The client device 202 is configured to communicate via network 204. The client device 202 can execute an application, for example, a browser application that allows a user of the client device 202 to interact with the social networking system 100. In another embodiment, the client device 202 interacts with the social networking system 100 through an application programming interface (API) that runs on the native operating system of the client device 202, such as iOS 4 and DROID.

Similarly, a third-party communication service client device 222 comprises a computing device that can receive user input and can transmit and receive data via the network 204. In one embodiment, the third-party communication service client device 222 is a conventional computer system executing, for example, a Microsoft Windows-compatible operating system (OS), Apple OS X, and/or a Linux distribution. In another embodiment, the third-party communication service client device 222 can be a device having computer functionality, such as a personal digital assistant (PDA), mobile telephone, smart-phone, etc. The third-party communication service client device 222 is configured to communicate via network 204. The third-party communication service client device 222 can execute an application, for example, a browser application that allows a user of the third-party communication service client device 222 to interact with a third-party communication service 214. In one embodiment, the third-party communication service client device 222 interacts with the social networking system 100 via the third-party communication service 214. In another embodiment, the third-party communication service client device 222 interacts with the third-party communication service 214 through an application programming interface (API) that runs on the native operating system of the third-party communication service client device 222, such as iOS 4 and DROID. In yet another embodiment, the third-party communication service client device 222 interacts with the social networking system 100 via the third-party communication service 214 through an application programming interface (API) that runs on the native operating system of the third-party communication service client device 222, such as iOS 4 and DROID.

In one embodiment, the network 204 uses standard communications technologies and/or protocols. Thus, the network 204 can include links using technologies such as Ethernet, 802.11, worldwide interoperability for microwave access (WiMAX), 3G, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

A third-party communication service 214 operates its own servers separate from the social networking system 100. In one embodiment, the third-party communication service 214 operates on a conventional computer system executing, for example, a Microsoft Windows-compatible operating system (OS), Apple OS X, and/or a Linux distribution. In another embodiment, the third-party communication service 214 operates on a device having computer functionality, such as a personal digital assistant (PDA), mobile telephone, smart-phone, etc. The third-party communication service 214 is configured to communicate via network 204. The third-party communication service 214 may employ its own proprietary technology to capture, compress, and transmit audiovisual content over the network 204. This technology may also include javascript plug-ins, embedded video compression technology, and standard audio/video codecs. Conventional components such as network interfaces, security functions, load balancers, failover servers, management and network operations consoles, and the like are not shown because the details of the third-party communication service 214 are unknown to administrators of the social networking system 100.

FIG. 2 contains a block diagram of the social networking system 100. The social networking system 100 includes a video calling interface module 102, a video receiving interface module 104, a video send communications module 114, a call handling module 116, a video receive communications module 118, a user identifier encrypting module 122, a web server 212, a shadow identifier generating module 128, an encrypted user identifier store 218, a call session store 220, a user profile store 206, a connection store 208, and a shadow identifier store 210. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 212 links the social networking system 100 via the network 204 to one or more client devices 202, the third-party communication service 214, and third-party communication service client devices 222; the web server 212 serves web pages, as well as other web-related content, such as Java, Flash, XML, and so forth. The web server 212 may provide the functionality of receiving and routing messages between the social networking system 100 and the client devices 202, for example, instant messages, queued messages (e.g., email), text and SMS (short message service) messages, or messages sent using any other suitable messaging technique. A user can send a request to the web server 212 to send a video chat request to a user of a third-party communication service, for example, using information found in that user's user profile object 106 stored in the user profile store 206. This chat request, sent via a client device 202, can be transmitted through the social networking system 100 to a third-party communication service 214, which in turn sends a request to the associated third-party communication service client device 222 via the network 204. Additionally, the web server 212 may provide API functionality to send data directly to native client device operating systems, such as iOS, DROID, webOS, and RIM on client devices 202 as well as a third-party communication service client device 222.

The web server 212 may also serve web pages including profile information extracted from user profile objects 106 via the network 204 to a third-party communication service 214. The third-party communication service 214 may utilize the profile information to maintain online presence information of other users of the social networking system 100 that are connected to a user and display this presence information on a third-party communication service client device 222 via a web browser or native application. The web server 212 may also render calling and receiving interfaces in third-party applications on client devices 202, in one embodiment. In another embodiment, a web server 212 may respond to API requests for content in rendering calling and receiving interfaces on the native platform's operating system of a client device 202, such as iOS and DROID, that appear as pop up interfaces in native applications.

A user profile store 206 maintains profile information about users of the social networking system 100, such as age, gender, interests, geographic location, email addresses, credit card information, and other personalized information. The user profile store 206 also maintains information about objects in the encrypted user identifier store 218, call session store 220, connection store 208, and shadow identifier store 210 that the users performed actions on. For example, the fact that a user that regularly calls another user on the social networking system 100 may be stored in both users' user profile objects 106 stored in the user profile store 206 and their call session objects 120, shadow identifier objects 128, and encrypted user identifier objects 124 would be associated with their user profile objects 106. In one embodiment, the user profile store 206 also maintains the connections of the users of the social networking system 100. In this way, a module may access the user profile object 106 of a user and identify the user profile objects 106 that are the user's connections on the social networking system 100. In another embodiment, connection objects 108 are maintained in a connection store 208. Connection objects 108 are associated with user profile objects 106 as users' connections on the social networking system 100.

A shadow identifier store 210 maintains shadow identifier objects 130 that have been generated by the shadow identifier generating module 128. Shadow identifier objects 130 are generated for a calling user 110 and a receiving user 112 when either type of user first utilizes a third-party communication service 214 via the social networking system 100. In order for users of the social networking system 100 to utilize the proprietary technology provided by a third-party communication service 214, shadow identifier objects 130 are generated for the users to enable the third-party communication service 214 to identify these users. Shadow identifier objects are stored in the shadow identifier store 210 and are associated with their respective users' user profile objects 106 stored in the user profile store 206.

An encrypted user identifier store 218 maintains encrypted user identifier objects 124 generated by a user identifier encrypting module 122. A third-party communication service 214 may request profile information about users of a social networking system 100, including an encrypted user identifier, so that presence information about the users' connections on the social networking system 100 may be provided to both users of the social networking system 100 and users of the third-party communication service 214. Presence information indicating the availability of users to accept incoming video conferencing calls, for example, is integral to the video conferencing experience. For example, if a calling user 110 wants to make a video conference call with a random available connection 132 in San Francisco, who is male and single, a social networking system 100 may provide profile information and presence information of available connections 132 meeting these criteria, directly or indirectly connected to the calling user 110, to the third-party communication service 214 using encrypted user identifier objects 124. In order to maintain the security of profile information and the privacy of its users, encrypted user identifier objects 124 are generated upon the first utilization of the third-party communication service 214 via the social networking system 100 and are provided to the third-party communication service 214. These encrypted user identifier objects 124 are stored in the encrypted user identifier store 218 and are associated with the respective user profile objects 106 stored in the user profile store 206. In one embodiment, the encrypted user identifier objects 124 are utilized as shadow identifier objects 130 by the third-party communication service 214 to refer to users of the social networking system 100. In another embodiment, a separate shadow identifier object 130 is generated by the third-party communication service 214 for a user when the encrypted user identifier object 124 is received by the third-party communication service 214.

Accessing a Third-Party Communication Service via a Social Networking System

Figure 3:
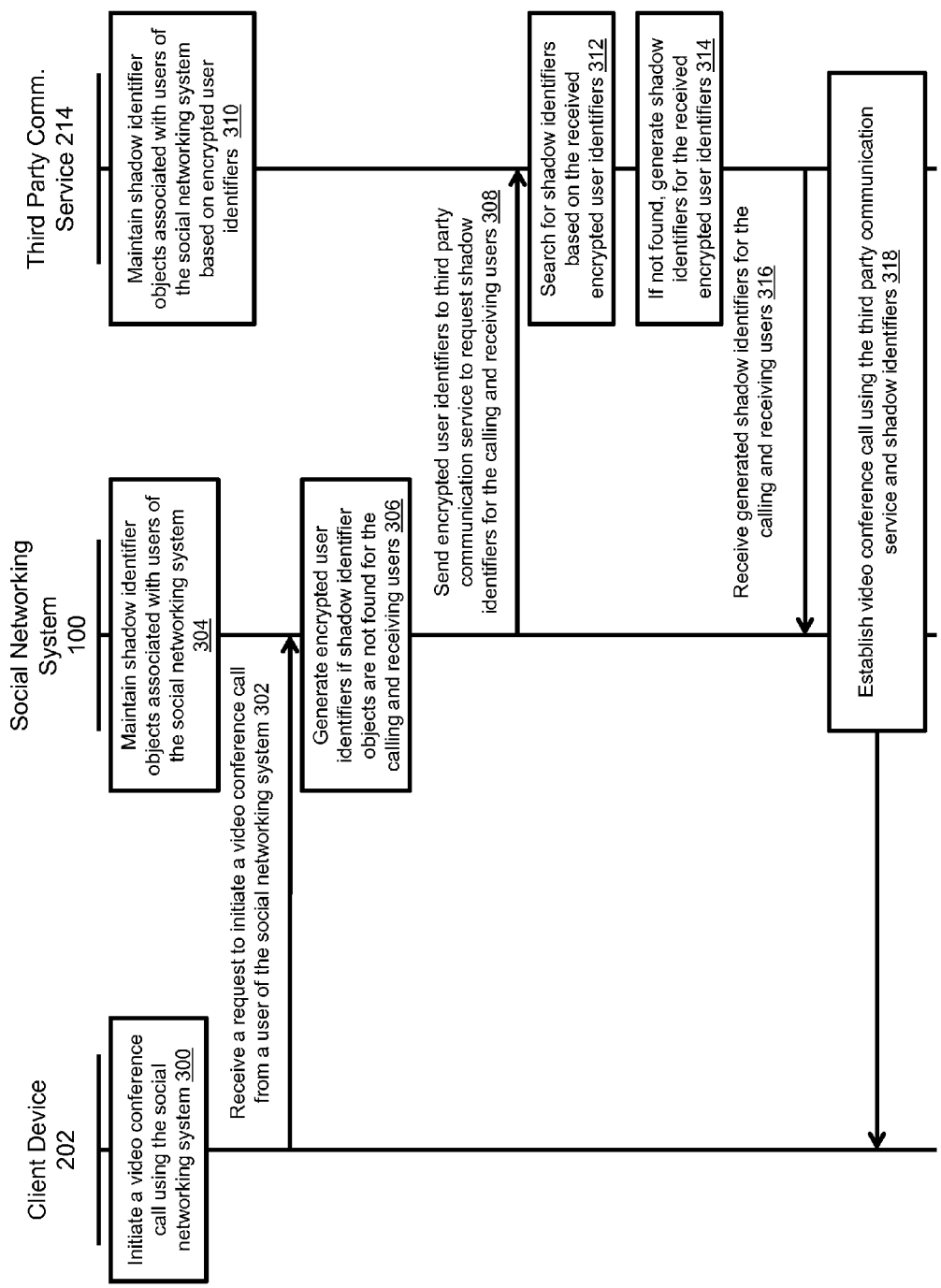
FIG. 3 is an interaction diagram of a process for generating shadow identifiers to reference users of a social networking system in communicating with a third-party communication service, in accordance with an embodiment of the invention.

FIG. 3 illustrates a process for generating encrypted user identifiers, associated with users of a social networking system, and sharing the encrypted user identifiers with a third-party communication service to generate shadow identifiers for the associated users of the social networking system, in accordance with an embodiment of the invention. A user of the social networking system 100, via a client device 202, initiates 300 a video conference call. The social networking system 100 receives 302 a request to initiate a video conference call from the client device 202. Asynchronously, the social networking system 100 maintains 304 shadow identifier objects associated with users that have already been generated. Because the video conference call is established using technology provided by a third-party communication service, the social networking system 100 generates 306 encrypted user identifiers for the calling and/or receiving users in the initiated video conference call if shadow identifier objects are not found for the calling and/or receiving users. The social networking system 100 sends 308 the encrypted user identifiers for the calling and/or receiving users to the third-party communication service 214 to request shadow identifiers.

The third-party communication service 214 maintains 310 a store of previously generated shadow identifiers that are based on encrypted user identifiers received from the social networking system 100. In one embodiment, the third-party communication service 214 maintains 310 a store of encrypted user identifiers that act as shadow identifiers. The social networking system 100 sends 308 a request for shadow identifiers based on encrypted user identifiers for the calling and receiving users in the initiated video conference call. The third-party communication service 214 searches 312 for shadow identifiers based on the encrypted user identifiers in the request. If encrypted user identifiers are not found, then shadow identifiers associated with the calling and receiving users are generated 314 and associated with the received encrypted user identifiers.

The social networking system 100 receives 316 the generated shadow identifiers from the third-party communication service 214 for the calling and/or receiving users. At this point, both the social networking system 100 and the third-party communication service 214 are able to refer to the calling and/or receiving users by the generated shadow identifiers. The shadow identifiers are used by the social networking system 100 and the third-party communication service 214 to establish 318 the video conference call. In other embodiments, the encrypted user identifiers and shadow identifiers may be used by a third-party communication service to establish other types of services, such as a VoIP phone call, a music file sharing session, content sharing such as movies, music, and games, and/or a collaborative work environment. As a result, the client device 202 of the social networking system 100 may access a third-party communication service 214 and use its technology without sacrificing the security of user data, including the user identifier used by the social networking system 100 to identify the user, as well as the privacy of the user accessing the third-party communication service 214. In addition, the user of the client device 214 may not even be aware that the video conference call is being supported by a third-party communication service because the user does not need to enter or create a separate login for the third-party communication service.

Figure 4:
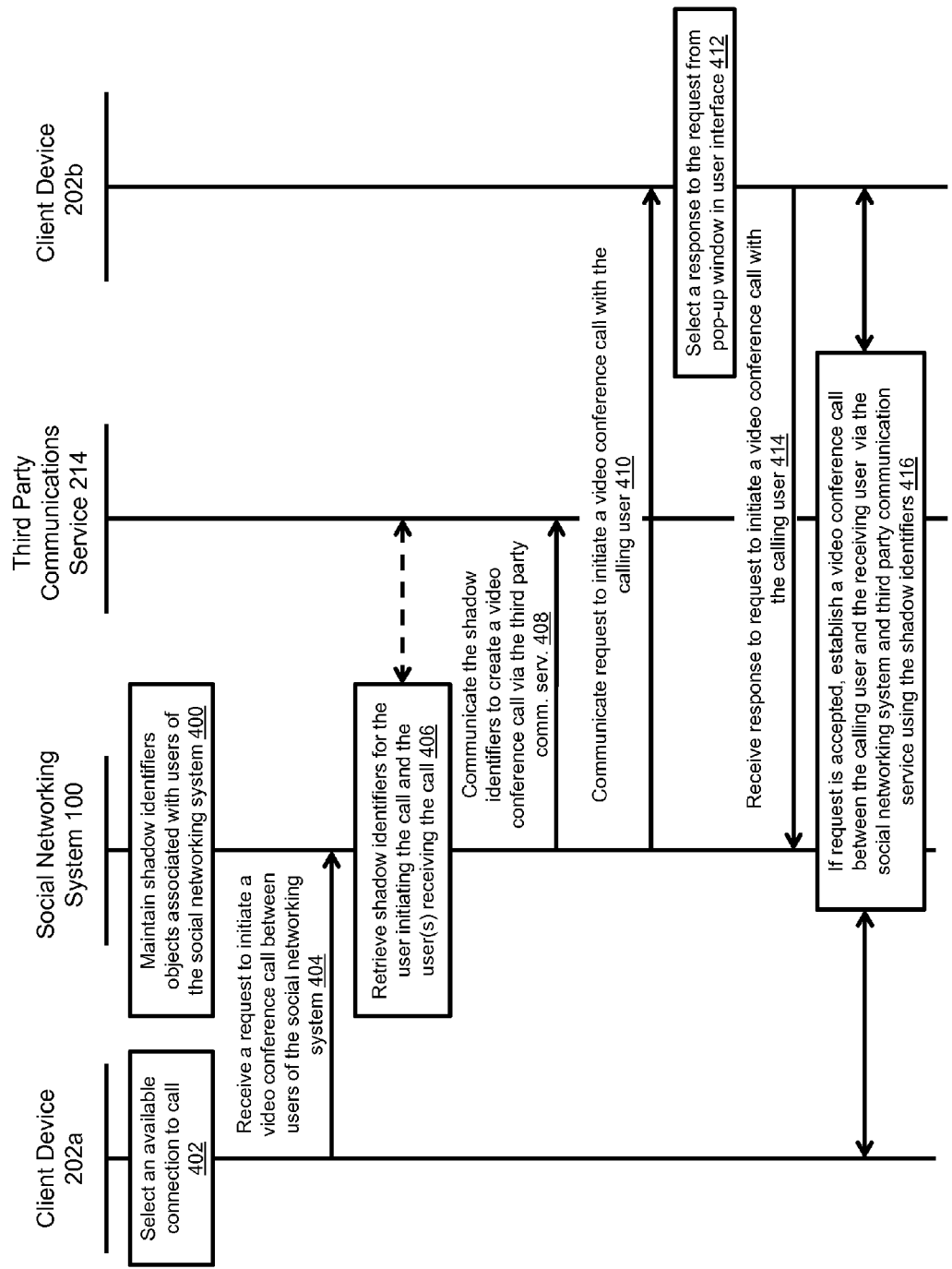
FIG. 4 is an interaction diagram of a process for utilizing a third-party communication service via a social networking system between client devices connected to the social networking system, in accordance with an embodiment of the invention.

FIG. 4 illustrates a process for using technology provided by a third-party communication service between users of a social networking system, in accordance with an embodiment of the invention. The social networking system 100 maintains 400 shadow identifiers associated with users of the social networking system 100. A client device 202a may select 402 an available connection to call. Availability of connections on a social networking system 100 may be related to whether users are logged into the social networking system 100, in one embodiment. In another embodiment, availability is determined by users that choose to be available to receive calls. Suppose that Angelina is a user of the social networking system 100 and would like to call her friend, Britney, who is another user of the social networking system 100. Even though Britney is connected to Angelina on the social networking system 100, Britney may wish to be unavailable to take calls from 9:00 AM to 5:00 PM because she is at work on her next album. At 5:01 PM, if Britney is actively using the social networking system 100 via a client device 202a, Angelina, the calling user 110, may initiate a video conference call with Britney because the social networking system 100 senses that Britney is now an available connection 132. As illustrated in FIG. 4, a client device 202a associated with the calling user, Angelina in this example, of the social networking system 100 selects 402 an available connection to call.

The social networking system 100 receives 404 a request to initiate a video conference call between users of the social networking system 100 from a client device 202a. In one embodiment, a calling user 110 may initiate a call with an available connection 132 one at a time. In another embodiment, a calling user 110 may select 402 multiple available connections 132 to join a video conference call. In yet another embodiment, a calling user 110 may initiate a call with an available connection 132 while an existing video conference call is in progress and then switch back and forth between calls or merge the two calls into one video conference call. The social networking system 100 then retrieves 406 shadow identifiers for the calling user 110 and/or receiving user(s) 112. The social networking system 100 may already have received shadow identifiers for the calling and/or receiving users through the process illustrated in FIG. 3. However, shadow identifiers may still need to be retrieved 406 by communicating encrypted user identifiers to the third-party communication service 214 using the process illustrated in FIG. 3. The social networking system 100 then communicates 408 the shadow identifiers for the calling and receiving users to the third-party communication service 214 to create a video conference call. Referring to the example above, the shadow identifiers associated with Angelina and Britney are retrieved 406 and then communicated 408 to the third-party communication service 214 to create a communication session, such as a video conference call.

The social networking system 100 communicates 410 the request to initiate a video conference call to a client device 202b that is associated with a receiving user 112. If there are multiple receiving users 112, the social networking system 100 communicates 410 a separate request for each of the receiving users 112 to their respective client devices 202, in one embodiment. In another embodiment, the social networking system 100 manages the communication of the requests to initiate a video conference call with multiple receiving users 112 before communicating 408 the shadow identifiers for the calling and receiving users to the third-party communication service 214. On the client device 202b, a pop-up window may be rendered such that the receiving user may select 412 a response to the request. The social networking system 100 then receives 414 a response to the request to initiate the video conference call from the client device 202b associated with a receiving user 112. If the receiving user 112 accepted the call, then the social networking system 100 and the third-party communication service 214 establishes 416 a video conference call between the calling and receiving users using the shadow identifiers. Through this video conference call, audio/video content may be communicated between the client devices 202. In other embodiments, other types of communication protocols may be established 416, such as file-sharing, VoIP telephony, and remote virus detection.

In one embodiment, the third-party communication service 214 receives presence information about the available connections 132 of a calling user 110 based on the presence information of users maintained by the social networking system 100. The social networking system 100 sends presence information about shadow identifiers based on the presence information of its users in response to a query from the third-party communication service 214. Similarly, the third-party communication service 214 may share presence information with the social networking system 100 about its users via shadow identifiers on a rolling basis, periodically sending batch updates. In another embodiment, presence information may be shared in real-time between the social networking system 100 and the third-party communication service 214.

Figure 5A:
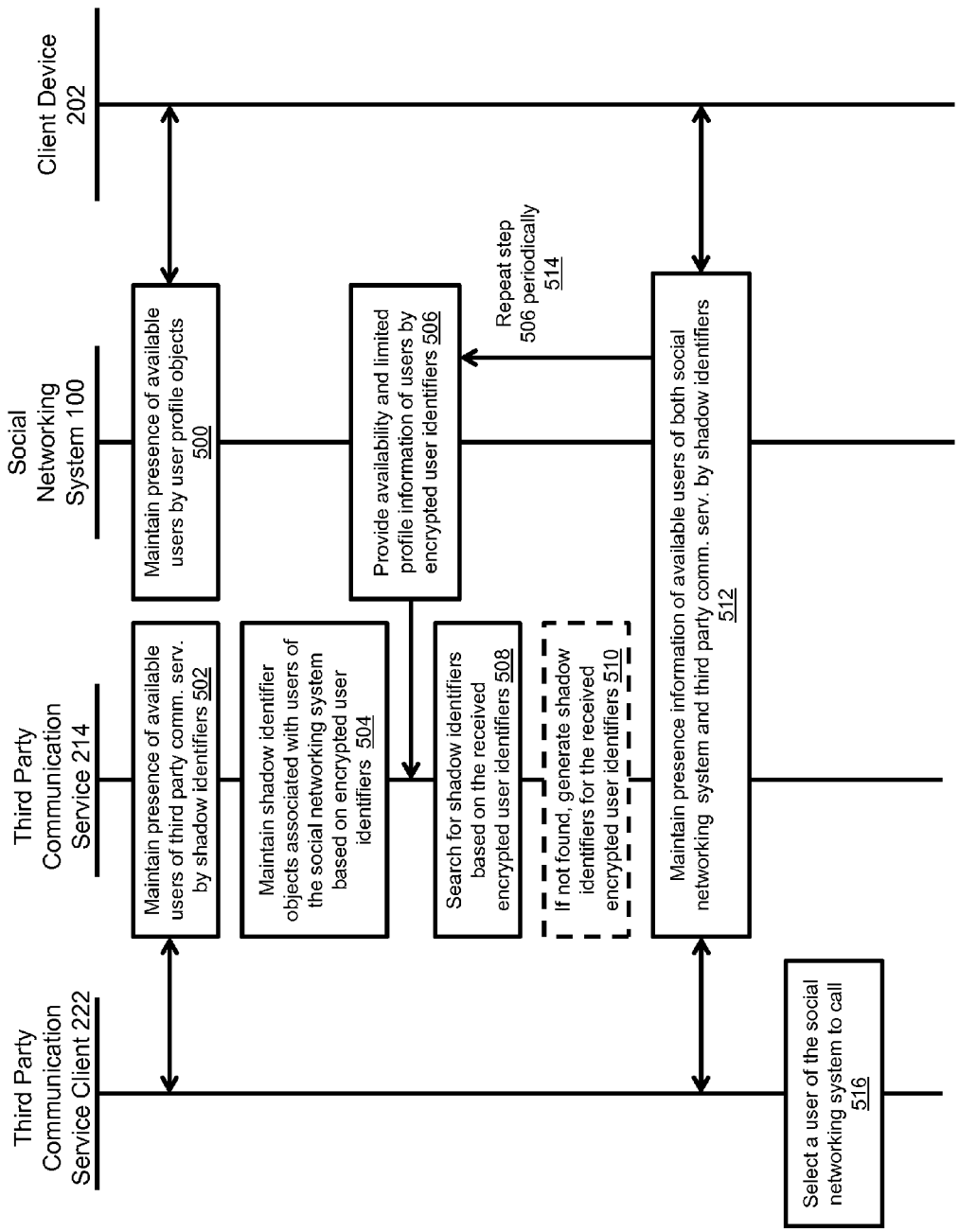
FIGS. 5A and 5B are interaction diagrams of processes for communicating between a third-party communication service client device and a user of a social networking system, in accordance with an embodiment of the invention.
Figure 5B:
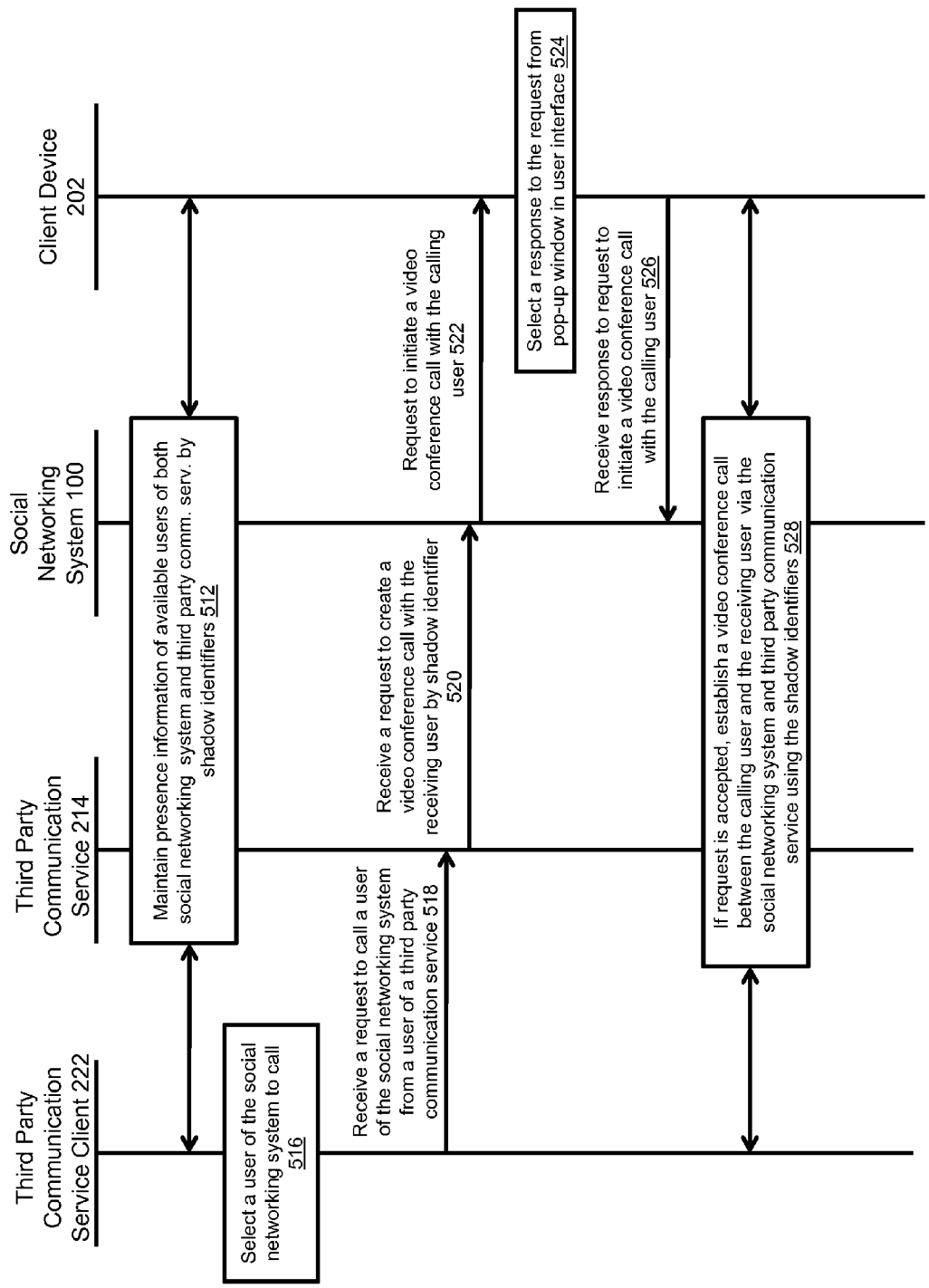

FIGS. 5A and 5B illustrate processes for communicating between a user of a social networking system 100 and a third-party communication service client device 222, in accordance with an embodiment of the invention. Suppose that Charlie is not a user of the social networking system, but is a user of a third-party communication service 214 that is accessible via the social networking system 100. In this example, Deena is user of the social networking system 100 that has received a video conference call using the third-party communication service 214 in the past, meaning that a shadow identifier has already been generated for Deena. In one embodiment, administrators of the social networking system 100 may enable users of the third-party communication service 214 to initiate video conference calls with users of the social networking system 100, depending on the privacy and usage settings of the users of the social networking system 100 in regards to availability and accessibility.

In this embodiment, a user of the social networking system 100, such as Deena, may decide to be available for video conference calls from users of the third-party communication service 214. In this example, there is no preexisting connection between Charlie and Deena, but Deena is connected to a friend of Charlie's on the third-party communication service 214, Nicole, who is a user of both the third-party communication service 214 and the social networking system 100. Nicole enabled her connections on the social networking system 100 to be shared with the third-party communication service 214. In doing so, encrypted user identifiers of Nicole's connections on the social networking system 100 were communicated to the third-party communication service 214 and shadow identifiers were generated via the processes described above and specifically illustrated in FIGS. 3 and 4. Consequently, the social networking system 100 and the third-party communication service 214 may identify the presence and/or availability of users of the social networking system 100 using their associated shadow identifiers. As a result, the third-party communication service 214 has received Deena's shadow identifier.

FIG. 5A illustrates a process of how presence information is communicated from a social networking system 100 to a third-party communication service 214. The social networking system 100 maintains 500 presence of available users on the social networking system 100 by the user profile objects associated to the available users. As mentioned above, availability may be determined by a social networking system 100 simply by detecting the online presence of a user on the social networking system 100 or by user-selected settings of availability to receive calls, in one embodiment. In another embodiment, users that are logged in to the social networking system 100 may be available to receive a call based on a similarity of interests with the calling user. The social networking system 100 senses the online presence of a client device 202 associated with a user to maintain 500 the presence of available users.

A third-party communication service 214 maintains 502 presence information of available users on the third-party communication service 214 using shadow identifiers associated with the available users. The third-party communication service 214 maintains 502 this information about its own users so that it may reference its own users to the social networking system 100 to provide presence information. The third-party communication service 214 also maintains 504 shadow identifier objects associated with users of the social networking system 100 based on their encrypted user identifiers.

As more users of the social networking system 100 become available, the social networking system 100 provides 506 this availability and limited profile information about these users to the third-party communication service 214, identifying these users by encrypted user identifiers. With this new information, the third-party communication service 214 searches 508 for shadow identifiers matching the provided 506 encrypted user identifiers. If shadow identifiers are not found for received encrypted user identifiers of available users of the social networking system 100, then shadow identifiers are generated 510 for those encrypted user identifiers.

In this way, the third-party communication service 214 and the social networking system 100 are able to maintain 512 presence information for users of the third-party communication service 214 and users of the social networking system 100, identifying all users by shadow identifiers. By periodically repeating 514 step 506, providing available users of the social networking system 100 to the third-party communication service 214, the presence information of those users may be maintained 512 by the third-party communication service 214. Although not illustrated, the third-party communication service 214 may also provide presence information of the third-party communication service 214 that are available, identifying these users by shadow identifiers, so that the social networking system 100 may maintain 512 the presence information of those users. In the above example, Deena, a user of the social networking system 100, has opted to be available to receive calls from users of the third-party communication service 214, such as Charlie, even though they are not connected on either the social networking system 100 or the third-party communication service 214. Deena's presence information is maintained 500 by the social networking system 100 when Deena logs in on her client device 202. Deena's shadow identifier had already been generated and communicated to the third-party communication service 214, so when her presence as an available user is provided 506 to the third-party communication service 214, a shadow identifier associated with her encrypted user identifier is found when searched 508 for by the third-party communication service 214. Thus, Deena's availability and presence information is maintained 512 by the third-party communication service 214. Charlie, a user of the third-party communication service 214, may be provided Deena's limited profile information and her presence information as an available user to initiate a video conference call. A calling user using a third-party communication service client device 222 may select 516 an available user of the social networking system 100 to call.

In another embodiment, a user of the third-party communication service 214 may select 516 to initiate a call with a connection on the third-party communication service 214 who is also a user of the social networking system 100. For example, Edward may be a user of both the third-party communication service 214 and the social networking system 100. In this case, Edward would already have an identifier on the third-party communication service 214 which would serve as a shadow identifier for identifying Edward to the social networking system 100, in one embodiment. If Edward, using the third-party communication service client device, wanted to know which of his friends on the social networking system 100 were available for a call, the user identifier associated with Edward on the social networking system would be unknown to the third-party communication service 214. In one embodiment, the third-party communication service 214 could utilize an application programming interface (API) provided by the social networking system 100 to verify Edward's identity on the social networking system 100. This would enable Edward's encrypted user identifier to be communicated to the third-party communication service 214 and a shadow identifier could be generated from the received encrypted user identifier. Edward's identifier on the third-party communication service 214 may be associated with this newly generated shadow identifier, in one embodiment. As a result, the third-party communication service 214 may utilize the application programming interface provided by the social networking system 100 to retrieve Edward's available connections on the social networking system 100 by the newly generated shadow identifier associated with Edward. In this way, Edward's user identifier on the social networking system 100 remains unknown to the third-party communication service 214.

Franc, an available connection who uses both the social networking system 100 and the third-party communication service 214, may be identified as an available user for Edward to call using shadow identifiers, even if Franc had not added Edward as a connection on the third-party communication service 214, provided that Franc and Edward are connected users on the social networking system 100. Using the provided application programming interface, two users, both using a third-party communication service client device 222, may discover each other on the third-party communication service 214 by the shadow identifiers that identify them as connections on the social networking system 100 and connect on a video conference call, in one embodiment. In another embodiment, the third-party communication service 214 augments a user's contact list on the third-party communication service 214 with connected users on the social networking system 100 after information is shared between the third-party communication service 214 and the social networking system 100.

In yet another embodiment, a user of the third-party communication service 214 may select 516 to initiate a call with a random user of the social networking system 100 that is available. For example, Gorden, a user of the third-party communication service 214, may wish to initiate a call with a random available user on the social networking system 100. Holly, a user of the social networking system 100, may be chosen by the social networking system 100 as an available user for Gorden to call. In this embodiment, the calling user 110, Gorden in this example, may be provided with targeting criteria to filter the random available users on the social networking system 100. For example, Gorden may wish to make a video conference call with any single female aged 25-35 that lives near San Diego, Calif. Other targeting criteria may include school attended, interests, friends of friends only, and so forth. Receiving users 112, such as Holly, may accept or decline the request to initiate a video conference call. Because the presence information of users like Holly is maintained 512 by the third-party communication service 214 in conjunction with the social networking system 100 using shadow identifiers, as described above, the privacy and security of Holly's user identifier is not divulged. In summary, available connections for users of either the social networking system 100 or the third-party communication service 214 may include direct connections on the social networking system 100, suggested connections based on similar affinities for users and interests, indirect connections, or even users of a third-party communication service 214 that are not users of the social networking system 100. User identifiers for these users on the social networking system 100 (if applicable) are not shared with the third-party communication service 214, but instead shadow identifiers are used to reference these users to display their availability to other users of the social networking system 100 and the third-party communication service 214.

Referring to FIG. 5B, a third-party communication service 214 receives 518 a request to call a user of the social networking system 100 from a third-party communication service client device 222. A request from the third-party communication service 214 is received 520 to create a video conference call with the selected receiving user by the social networking system 100 shadow identifier associated with the selected receiving user 112 on the social networking system 100.

The social networking system 100 requests 522 the client device 202 of the social networking system 100 to initiate a video conference call. The client device 202 selects 524 a response to the request to initiate a video conference call from a pop-up window in a user interface rendered on the client device 202. The social networking system 100 receives 526 a response to the request to initiate a video conference call from the client device 202. If the call is accepted by the receiving user 112 via the client device 202, then the social networking system 100 establishes 528 a video conference call between the calling user 110 and the receiving user 112 via the social networking system 100 and the third-party communication service 214 using the shadow identifiers for the calling and receiving users.

Accessing Other Types of Third-Party Communication Services

Although the Figures have described a video conferencing third-party communication service, other types of third-party communication services may use the same basic infrastructure, including the user identifier encrypting module 122, a sending 114 and receiving 118 communications module, sending 102 and receiving 104 interface modules, a communication handling module 116 (or communication protocol module), a shadow identifier generating module 128, and the objects created by the modules. Other types of third-party communication services may include other social networking systems; content publishing services, such as blogging and micro-blogging platforms; file sharing platforms, including video, music, and document sharing platforms; traditional phone companies that use their own login credential system; e-commerce inventory systems, including physical inventory resellers; music distribution platforms; and corporate enterprise systems that track inventory, shipments, and sales. In short, any third-party system that uses a communication service with separate login credentials for users may utilize the modules described above so that users of a social networking system may access these third-party communication services from a client device of the social networking system.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
maintaining user profiles for a plurality of users of a social networking system, the user profiles including identifying information about the plurality of users;
encrypting a user identifier associated with a user profile of the initiating user of the social networking system;
communicating the encrypted user identifier to the third-party communication service;
establishing a shadow identifier with a third-party communication service for each of the plurality of users, each shadow identifier masking the identifying information from the corresponding user profile of the user, enabling the user to use the third-party communication service without revealing the identifying information of the user to the third-party communication service;
receiving the shadow identifier from the third-party communication service based on the encrypted user identifier;
storing the established shadow identifiers in association with the user profiles for the plurality of users;
receiving a request from an initiating user of the plurality of users to establish a communication session via the third-party communication service; and
establishing the communication session via the third-party communication service using the shadow identifier associated with the initiating user, wherein the third-party communication service cannot access the identifying information of the initiating user from the shadow identifier associated with the initiating user.

2. The method of claim 1, wherein the received request from the initiating user to establish the communication session via the third-party communication service comprises establishing the communication session with a recipient user from the plurality of users, wherein establishing the communication session further comprises using a second shadow identifier associated with the recipient user.

3. The method of claim 1, wherein the received request from the initiating user to establish the communication session via the third-party communication service comprises establishing the communication session with an external user of the third-party communication service.

4. The method of claim 1, wherein
the encrypted user identifier is used as the shadow identifier.

5. The method of claim 1, further comprising:
receiving presence information about available connections of the initiating user for establishing the communication session; and
providing the presence information about the available connections of the initiating user to establish the communication session.

6. The method of claim 5, wherein receiving presence information about available connections of the initiating user for establishing the communication session comprises:
retrieving connections on the social networking system from a user profile object associated with the initiating user;
determining an availability for each connection of the retrieved connections; and
providing the connections determined as available as the presence information about available connections of the initiating user.

7. The method of claim 6, wherein the availability of a connection comprises a user-selected time period.

8. The method of claim 5, wherein receiving presence information about available connections of the initiating user for establishing the communication session comprises:
receiving presence information about other users of the social networking system that are not connected to the initiating user.

9. The method of claim 1, wherein the third-party communication service comprises a service selected from the group consisting of a video conferencing service, a VoIP telephony service, a social networking service, a file sharing platform, a content publishing service, a corporate enterprise system, an e-commerce inventory system, and an SMS service.

10. A computer program product embodied on a non-transitory computer-readable storage medium storing executable computer program instructions, the instructions executable to perform steps comprising:
maintaining user profiles for a plurality of users of a social networking system, the user profiles including identifying information about the plurality of users;
encrypting a user identifier associated with a user profile of the initiating user of the social networking system;
communicating the encrypted user identifier to the third-party communication service;
establishing a shadow identifier with a third-party communication service for each of the plurality of users, each shadow identifier masking the identifying information from the corresponding user profile of the user, enabling the user to use the third-party communication service without revealing the identifying information of the user to the third-party communication service;
receiving the shadow identifier from the third-party communication service based on the encrypted user identifier;
storing the established shadow identifiers in association with the user profiles for the plurality of users;
receiving a request from an initiating user of the plurality of users to establish a communication session via the third-party communication service; and
establishing the communication session via the third-party communication service using the shadow identifier associated with the initiating user, wherein the third-party communication service cannot access the identifying information of the initiating user from the shadow identifier associated with the initiating user.

11. The computer program product of claim 10, wherein the received request from the initiating user to establish the communication session via the third-party communication service comprises establishing the communication session with a recipient user from the plurality of users, wherein establishing the communication session further comprises using a second shadow identifier associated with the recipient user.

12. The computer program product of claim 10, wherein the received request from the initiating user to establish the communication session via the third-party communication service comprises establishing the communication session with an external user of the third-party communication service.

13. The computer program product of claim 10, wherein the encrypted user identifier is used as the shadow identifier.

14. The computer program product of claim 10, the instructions further comprising:
receiving presence information about available connections of the initiating user for establishing the communication session; and providing the presence information about the available connections of the initiating user to establish the communication session.

15. The computer program product of claim 14, wherein receiving presence information about available connections for establishing the communication session comprises:
retrieving connections on the social networking system from a user profile object associated with the initiating user;
determining an availability for each connection of the retrieved connections; and
providing the connections determined as available as the presence information about available connections of the initiating user.

16. The computer program product of claim 14, wherein receiving presence information about available connections of the initiating user for establishing the communication session comprises:
receiving presence information about other users of the social networking system that are not connected to the initiating user.

17. The computer program product of claim 10, wherein the third-party communication service comprises a service selected from the group consisting of a video conferencing service, a VoIP telephony service, a social networking service, a file sharing platform, a content publishing service, a corporate enterprise system, an e-commerce inventory system, and an SMS service.

18. A system comprising:
a processor; and
a non-transitory computer-readable storage medium storing instructions that when executed by the processor cause the processor to:
maintain user profiles for a plurality of users of a social networking system, the user profiles including identifying information about the plurality of users;
encrypt a user identifier associated with a user profile of the initiating user of the social networking system;
communicate the encrypted user identifier to the third-party communication service;
establish a shadow identifier with a third-party communication service for each of the plurality of users, each shadow identifier masking the identifying information from the corresponding user profile of the user, enabling the user to use the third-party communication service without revealing the identifying information of the user to the third-party communication service;
receive the shadow identifier from the third-party communication service based on the encrypted user identifier;
storing the established shadow identifiers in association with the user profiles for the plurality of users;
receive a request from an initiating user of the plurality of users to establish a communication session via the third-party communication service; and
establish the communication session via the third-party communication service using the shadow identifier associated with the initiating user, wherein the third-party communication service cannot access the identifying information of the initiating user from the shadow identifier associated with the initiating user.

19. The computer program product of claim 15, wherein the availability of a connection comprises a user-selected time period.

* * * * *

UNITED STATES PATENT AND TRADEMARK OFFICE
CERTIFICATE OF CORRECTION

PATENT NO.        : 9,736,095 B2
APPLICATION NO.   : 15/144697
DATED             : August 15, 2017
INVENTOR(S)       : Philip Ti-Fei Su Page 1 of 1

It is certified that error appears in the above-identified patent and that said Letters Patent is hereby corrected as shown below:

Column 19, Line 7, after "a user profile of" delete "the" and insert -- an --.
Column 19, Line 8, after "user identifier to" delete "the" and insert -- a --.
Column 19, Line 10, after "identifier with" delete "a" and insert -- the --.
Column 20, Line 22, after "a user profile of" delete "the" and insert -- an --.
Column 20, Line 24, after "user identifier to" delete "the" and insert -- a --.
Column 20, Line 26, after "identifier with" delete "a" and insert -- the --.
Column 22, Line 4, after "a user profile of" delete "the" and insert -- an --.
Column 22, Line 6, after "user identifier to" delete "the" and insert -- a --.
Column 22, Line 8, after "identifier with" delete "a" and insert -- the --.

Signed and Sealed this
Twenty-third Day of October, 2018

Andrei Iancu
*Director of the United States Patent and Trademark Office*